US012293724B2

(12) United States Patent
Kim et al.

(10) Patent No.: US 12,293,724 B2
(45) Date of Patent: May 6, 2025

(54) DISPLAY DEVICE

(71) Applicant: LG Display Co., Ltd., Seoul (KR)

(72) Inventors: So-Jeong Kim, Paju-si (KR); Nak-Yoon Kim, Paju-si (KR); Chan Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/528,505

(22) Filed: Dec. 4, 2023

(65) Prior Publication Data

US 2024/0221601 A1 Jul. 4, 2024

(30) Foreign Application Priority Data

Dec. 29, 2022 (KR) ........................ 10-2022-0189916

(51) Int. Cl.

*G09G 3/3266* (2016.01)
*G09G 3/20* (2006.01)
*G09G 3/3225* (2016.01)

(52) U.S. Cl.

CPC ......... *G09G 3/3266* (2013.01); *G09G 3/2096* (2013.01); *G09G 3/3225* (2013.01); *G09G 2300/0819* (2013.01); *G09G 2300/0842* (2013.01); *G09G 2300/0861* (2013.01); *G09G 2320/0233* (2013.01); *G09G 2320/0242* (2013.01); *G09G 2320/0247* (2013.01); *G09G 2320/0626* (2013.01); *G09G 2330/021* (2013.01)

(58) Field of Classification Search

CPC ......... G09G 3/3266; G09G 2300/0819; G09G 2320/0233; G09G 2320/0626; G09G 3/3225; G09G 3/3233

See application file for complete search history.

(56) References Cited

U.S. PATENT DOCUMENTS

2016/0314761 A1* 10/2016 Kim ......................... G09G 5/10
2022/0189393 A1* 6/2022 Kim ..................... G09G 3/3233
2023/0032883 A1* 2/2023 Park ..................... G09G 3/3241

FOREIGN PATENT DOCUMENTS

KR 10-2020-0030415 A 3/2020
KR 10-2022-0015111 A 2/2022
KR 10-2022-0036185 A 3/2022

* cited by examiner

*Primary Examiner* — Xuemei Zheng

(74) *Attorney, Agent, or Firm* — Birch, Stewart, Kolasch & Birch, LLP

(57) ABSTRACT

A display device includes a timing controlling unit configured to generate an image data, a data control signal and a gate control signal; a data driving unit configured to generate a data signal using the image data and the data control signal; a gate driving unit configured to generate a gate1 signal, an odd gate2 signal, an even gate2 signal, a gate3 signal, a gate4 signal and an emission signal using the gate control signal; and a display panel displaying an image using the gate1 signal, the odd gate2 signal, the even gate2 signal, the gate3 signal, the gate4 signal and the emission signal. A rising timing of the emission signal and a falling timing of the gate3 signal are changed according to a duty ratio.

12 Claims, 6 Drawing Sheets

DISPLAY DEVICE

CROSS-REFERENCE TO RELATED APPLICATIONS

The present application claims priority to Korean Patent Application No. 10-2022-0189916, filed in Republic of Korea on Dec. 29, 2022, which is hereby expressly incorporated by reference herein in its entirety into the present application.

BACKGROUND

Technical Field

The present disclosure relates to a display device, and more particularly, to a display device where an occurrence of an abnormal phenomenon due to a duty ratio difference is eliminated or minimized by adjusting a timing of a gate signal.

Discussion of the Related Art

Recently, with the advent of an information-oriented society, the interest in information displays for processing and displaying a massive amount of information and the demand for portable information media have increased. As such, a display field has rapidly advanced. Thus, various light and thin flat panel display devices have been developed and highlighted.

Among the various flat panel display devices, an organic light emitting diode (OLED) display device is an emissive type device that does not include a backlight unit used in a non-emissive type device such as a liquid crystal display (LCD) device. As a result, the OLED display device has advantages in a viewing angle, a contrast ratio and a power consumption to be applied to various fields.

The OLED display device uses a pulse width modulation (PWM) for controlling a luminance with the same voltage. Since the voltage of an anode of a light emitting diode is changed due to a coupling in an emission of a low gray level, an abnormal phenomenon such as a luminance inversion, a gamma breakdown and a black rising can occur and a display quality of a low gray level image can be deteriorated.

SUMMARY OF THE DISCLOSURE

Accordingly, the present disclosure is directed to a display device that substantially obviates one or more of the problems due to limitations and disadvantages of the related art.

An object of the present disclosure is to provide an organic light emitting diode display device where an occurrence of an abnormal phenomenon such as a luminance inversion, a gamma breakdown and a black rising is eliminated, reduced or minimized by adjusting a timing of a gate signal.

Another object of the present disclosure is to provide an organic light emitting diode display device where the voltage of an anode of a light emitting diode is kept constant due to the elimination of an influence of a coupling, and an occurrence of an abnormal phenomenon such as a luminance inversion, a gamma breakdown and a black rising can be eliminated, reduced or minimized by keeping an interval between an emission signal and a gate signal regardless of a duty ratio.

Additional features and advantages of the disclosure will be set forth in the description which follows, and in part will be apparent from the description, or can be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display device includes a timing controlling unit configured to generate an image data, a data control signal and a gate control signal; a data driving unit configured to generate a data signal using the image data and the data control signal; a gate driving unit configured to generate a gate1 signal, an odd gate2 signal, an even gate2 signal, a gate3 signal, a gate4 signal and an emission signal using the gate control signal; and a display panel configured to display an image using the gate1 signal, the odd gate2 signal, the even gate2 signal, the gate3 signal, the gate4 signal and the emission signal, wherein a rising timing of the emission signal and a falling timing of the gate3 signal are changed according to a duty ratio.

It is to be understood that both the foregoing general description and the following detailed description are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE EMBODIMENTS

Figure 1:
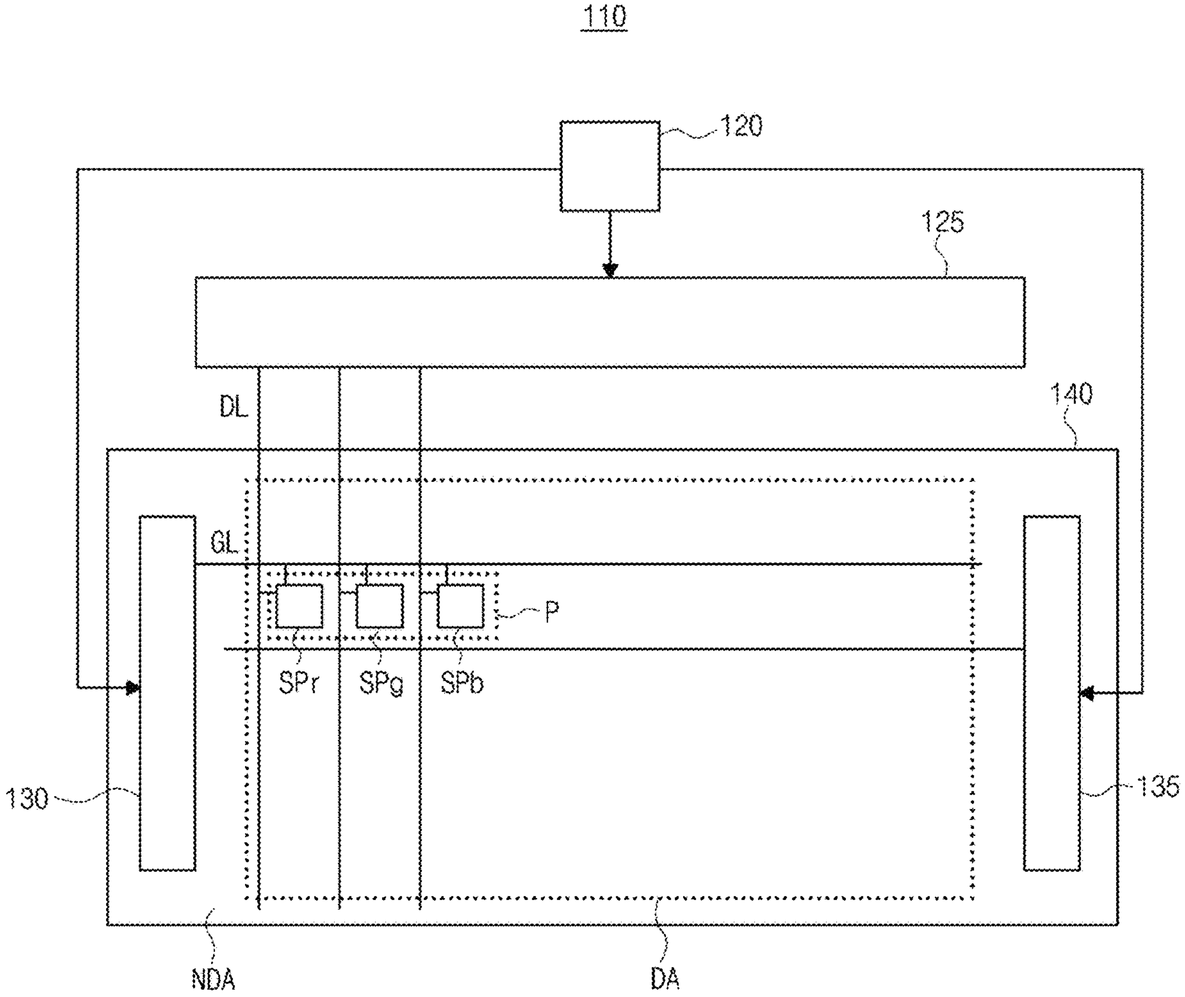
FIG. 1 is a view showing a display device according to an embodiment of the present disclosure.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure can be sufficiently thorough and complete to assist those skilled in the art to fully understand the scope of the present disclosure. Further, the present disclosure is only defined by scopes of claims.

The shapes, sizes, ratios, angles, numbers, and the like, which are illustrated in the drawings to describe various example embodiments of the present disclosure, are merely given by way of example. Therefore, the present disclosure is not limited to the illustrations in the drawings. Like reference numerals refer to like elements throughout the specification, unless otherwise specified.

In the following description, where the detailed description of the relevant known function or configuration can unnecessarily obscure a feature or aspect of the present disclosure, a detailed description of such known function or configuration can be omitted or a brief description can be provided.

Where the terms “comprise,” “have,” “include,” and the like are used, one or more other elements can be added unless the term, such as “only,” is used. An element described in the singular form is intended to include a plurality of elements, and vice versa, unless the context clearly indicates otherwise.

In construing an element, the element is to be construed as including an error or a tolerance range even where no explicit description of such an error or tolerance range is provided.

Where positional relationships are described, for example, where the positional relationship between two parts is described using “on,” “over,” “under,” “above,” “below,” “beside,” “next,” or the like, one or more other parts can be located between the two parts unless a more limiting term, such as “immediate(ly),” “direct(ly),” or “close(ly)” is used. For example, where an element or layer is disposed “on” another element or layer, a third layer or element can be interposed therebetween.

Although the terms “first,” “second,” A, B, (a), (b), and the like can be used herein to refer to various elements, these elements should not be interpreted to be limited by these terms as they are not used to define a particular order or precedence. These terms are only used to distinguish one element from another. For example, a first element could be termed a second element, and, similarly, a second element could be termed a first element, without departing from the scope of the present disclosure.

The term “at least one” should be understood to include all combinations of one or more of related elements. For example, the term of “at least one of first, second and third elements” can include all combinations of two or more of the first, second and third elements as well as the first, second or third element. Further, the term “unit” is interchangeably used with the terms such as a part, module, device, component, etc.

The term “display device” can include a display device in a narrow sense such as liquid crystal module (LCM), an organic light emitting diode (OLED) module and a quantum dot (QD) module including a display panel and a driving unit for driving the display panel. In addition, the term “display device” can include a complete product (or a final product) including the LCM, the OLED module and the QD module such as a notebook computer, a television, a computer monitor, an equipment display device including an automotive display apparatus or a shape other than a vehicle, and a set electronic apparatus or a set device (or a set apparatus) such as a mobile electronic apparatus of a smart phone or an electronic pad.

Accordingly, a display device of the present disclosure can include an applied product or a set device of a final user’s device including the LCM, the OLED module and the QD module as well as a display device in a narrow sense such as the LCM, the OLED module and the QD module.

According to circumstances, the LCM, the OLED module and the QD module having a display panel and a driving unit can be expressed as “a display device”, and an electronic apparatus of a complete product including the LCM, the OLED module and the QD module can be expressed as “a set device.” For example, a display device in a narrow sense can include a display panel of a liquid crystal, an organic light emitting diode and a quantum dot and a source printed circuit board (PCB) of a control unit for driving the display panel, and a set device can further include a set PCB of a set control unit electrically connected to the source PCB for controlling the entire set device.

The display panel of the present disclosure can include all kinds of display panels such as a liquid crystal display panel, an organic light emitting diode display panel, a quantum dot display panel and an electroluminescent display panel. The display panel of the present disclosure is not limited to a specific display panel of a bezel bending having a flexible substrate for an organic light emitting diode display panel and a lower back plate supporter. A shape or a size of the display panel for the display device of the present disclosure is not limited thereto.

For example, when the display panel is an organic light emitting diode display panel, the display panel can include a plurality of gate lines, a plurality of data lines and a subpixel in a crossing region of the plurality of gate lines and the plurality of data lines. The display panel can include an array having a thin film transistor of an element for selectively applying a voltage to each subpixel, an emitting element layer on the array and an encapsulating substrate or an encapsulation part covering the emitting element layer. The encapsulation part can protect the thin film transistor and the emitting element layer from an external impact and can prevent or at least reduce penetration of a moisture or an oxygen into the emitting element layer. In addition, a layer on the array can include an inorganic light emitting layer, for example, a nano-sized material layer or a quantum dot.

The thin film transistor of the present disclosure can include one of an oxide thin film transistor, an amorphous silicon thin film transistor, a low temperature polycrystalline silicon thin film transistor.

Features of various embodiments of the present disclosure can be partially or entirely coupled to or combined with each other. They can be linked and operated technically in various ways as those skilled in the art can sufficiently understand. The embodiments can be carried out independently of or in association with each other in various combinations.

Hereinafter, a display device according to various example embodiments of the present disclosure where an influence on an oxide semiconductor layer of a thin film transistor of a driving element part is reduced by shielding a light emitted and transmitted from a subpixel and/or a light inputted from an exterior will be described in detail with reference to the accompanying drawings. All the components of each display device according to all embodiments of the present disclosure are operatively coupled and configured.

FIG. 1 is a view showing a display device according to an embodiment of the present disclosure. The display device can be an organic light emitting diode (OLED) display device.

In FIG. 1, a display device 110 according to an embodiment of the present disclosure includes a timing controlling unit 120, a data driving unit 125, first and second gate driving units 130 and 135 and a display panel 140.

The timing controlling unit 120 generates an image data, a data control signal and a gate control signal using an image signal and a plurality of timing signals including a data enable signal, a horizontal synchronization signal, a vertical synchronization signal and a clock signal transmitted from an external system such as a graphic card or a television system. The image data and the data control signal are transmitted to the data driving unit 125, and the gate control signal is transmitted to the first and second gate driving units 130 and 135.

The data driving unit 125 generates a data signal (a data voltage) Vdata (of FIG. 2) using the data control signal and the image data transmitted from the timing controlling unit 120 and transmits the data signal to a data line DL of the display panel 140.

The first and second gate driving units 130 and 135 generate a gate signal (a gate voltage) Sc1, Sc2*o*, Sc2*e*, Sc3 and Sc4 (of FIG. 2) and an emission signal (an emission voltage) Em (of FIG. 2) using the gate control signal transmitted from the timing controlling unit 120 and applies the gate signal Sc1, Sc2*o*, Sc2*e*, Sc3 and Sc4 and the emission signal Em to a gate line GL of the display panel 140.

The first and second gate driving units 130 and 135 can have a gate in panel (GIP) type to be formed in a non-display area NDA of a substrate of the display panel 140. The display panel 140 includes a plurality of gate lines GL, a plurality of data lines DL, a plurality of pixels P arranged in a matrix configuration.

Although the first and second gate driving units 130 and 135 are disposed in both side portions of the display panel 140 in the embodiment of FIG. 1, one gate driving unit can be disposed in one side portion of the display panel 140 in another embodiment. Further, other variations are possible.

The display panel 140 includes a display area DA at a central portion thereof and the non-display area NDA surrounding the display area DA. As a variation, the non-display area NDA can surround the display area DA completely or only in part. The display panel 140 displays an image using the gate signal Sc1, Sc2*o*, Sc2*e*, Sc3 and Sc4, the emission signal Em and the data signal Vdata. For displaying an image, the display panel 140 includes the plurality of pixels P, the plurality of gate lines GL and the plurality of data lines DL in the display area DA.

Each of the plurality of pixels P includes red, green and blue subpixels SPr, SPg and SPb, and the gate line GL and the data line DL cross each other to define the red, green and blue subpixels SPr, SPg and SPb. Each of the red, green and blue subpixels SPr, SPg and SPb is connected to the gate line GL and the data line DL. Each pixel P can further include a white subpixel, or can have a different combination of color subpixels.

When the display device 110 is an OLED display device, each of the red, green and blue subpixels SPr, SPg and SPb can include a plurality of transistors such as a switching transistor, a driving transistor and a sensing transistor, a storage capacitor and a light emitting diode.

A structure of the subpixel SP of the display device 110 will be illustrated with reference to FIG. 2 as an example.

Figure 2:
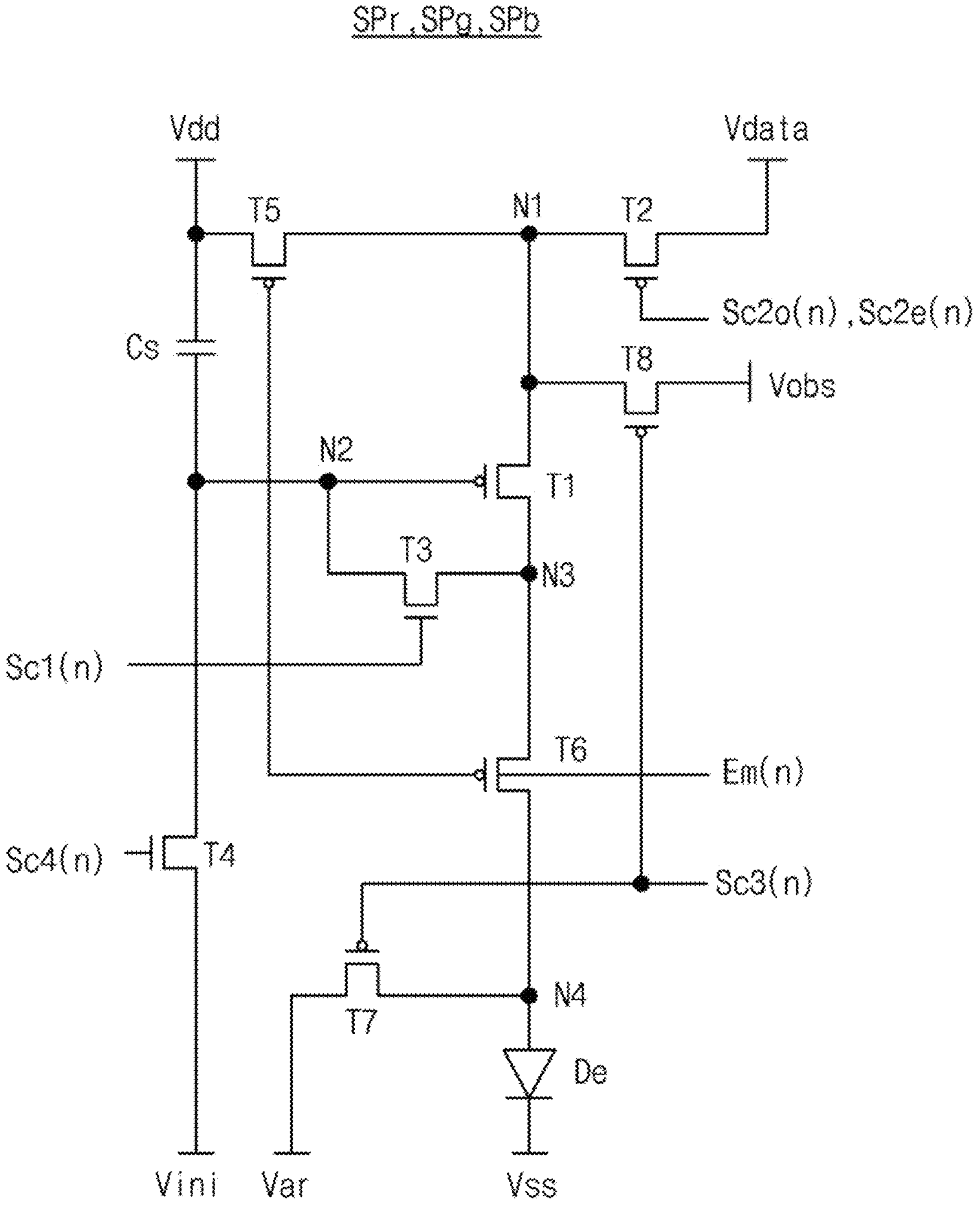
FIG. 2 is a circuit diagram showing a subpixel of a display device according to an embodiment of the present disclosure.

FIG. 2 is a circuit diagram showing a subpixel of a display device according to an embodiment of the present disclosure. The display device 110 can be an organic light emitting diode (OLED) display device. The display device 110 can be a quantum dot light emitting diode display device or an inorganic light emitting diode display device in another embodiment.

In FIG. 2, each of red, green and blue subpixels SPr, SPg and SPb (SP) of the display panel 140 of the display device 110 according to an embodiment of the present disclosure includes first to eighth transistors T1 to T8, a storage capacitor Cs and a light emitting diode De. At least one of the first to eighth transistors T1 to T8 can be an oxide semiconductor thin film transistor, and the others of the first to eighth transistors T1 to T8 can be low temperature polycrystalline silicon thin film transistor.

For example, the first, second, fifth, sixth, seventh and eighth transistors T1, T2, T5, T6, T7 and T8 can be positive (P) type low temperature polycrystalline silicon thin film transistors, and the third and fourth transistors T3 and T4 can be negative (N) type oxide semiconductor thin film transistors.

The first transistor T1 of a driving transistor is switched according to a voltage of the first capacitor electrode of the storage capacitor Cs. A gate electrode of the first transistor T1 is connected to the first capacitor electrode of the storage capacitor Cs, a drain electrode of the third transistor T3 and a drain electrode of the fourth transistor T4, a source electrode of the first transistor T1 is connected to a source electrode of the second transistor T2, a drain electrode of the fifth transistor T5 and a source electrode of the eighth transistor T8, and a drain electrode of the first transistor T1 is connected to a source electrode of the third transistor T3 and a source electrode of the sixth transistor T6.

The second transistor T2 of a switching transistor is switched according to an nth odd gate2 signal Sc2*o*(*n*) or an nth even gate2 signal Sc2*e*(*n*). Here, n can be a real number. A gate electrode of the second transistor T2 is connected to the nth odd gate2 signal Sc2*o*(*n*) or the nth even gate2 signal Sc2*e*(*n*), a source electrode of the second transistor T2 is connected to a source electrode of the first transistor T1, a drain electrode of the fifth transistor T5 and a source electrode of the eighth transistor T8, and a drain electrode of the second transistor T2 is connected to the data signal Vdata.

The third transistor T3 of a sensing transistor is switched according to an nth gate1 signal Sc1(*n*). A gate electrode of the third transistor T3 is connected to the nth gate1 signal Sc1(*n*), a source electrode of the third transistor T3 is connected to a drain electrode of the first transistor T1 and a source electrode of the sixth transistor T6, and a drain electrode of the third transistor T3 is connected to a gate electrode of the first transistor T1, a first capacitor electrode of the storage capacitor Cs and a drain electrode of the fourth transistor T4.

The fourth transistor T4 is switched according to an (n−1)th gate1 signal Sc1(*n*−1). A gate electrode of the fourth transistor T4 is connected to the (n−1)th gate1 signal Sc1(*n*−1), a source electrode of the fourth transistor T4 is connected to an initial voltage Vini, and a drain electrode of the fourth transistor T4 is connected to a gate electrode of the first transistor T1, a first capacitor electrode of the storage capacitor Cs and a drain electrode of the third transistor T3.

The fifth transistor T5 of an emission transistor is switched according to an nth emission signal Em(n). A gate electrode of the fifth transistor T5 is connected to the nth emission signal Em(n), a source electrode of the fifth transistor T5 is connected to a high level voltage Vdd and the second capacitor electrode of the storage capacitor Cs, and a drain electrode of the fifth transistor T5 is connected to a source electrode of the first transistor T1, a source electrode of the second transistor T2 and a source electrode of the eighth transistor T8.

The sixth transistor T6 of an emission transistor is switched according to an nth emission signal Em(n). A gate electrode of the sixth transistor T6 is connected to the nth emission signal Em(n), a source electrode of the sixth transistor T6 is connected to a drain electrode of the first transistor T1 and a source electrode of the third transistor T3, and a drain electrode of the sixth transistor T6 is connected to an anode of the light emitting diode De and a source electrode of the seventh transistor T7.

The seventh transistor T7 is switched according to an nth gate3 signal Sc3(*n*). A gate electrode of the seventh transistor T7 is connected to the nth gate3 signal Sc3(*n*), a source electrode of the seventh transistor T7 is connected to a drain electrode of the sixth transistor T6 and an anode of the light emitting diode De, and a drain electrode of the seventh transistor T7 is connected to an anode reset voltage Var.

The eighth transistor T8 is switched according to an nth gate3 signal Sc3(*n*). A gate electrode of the eighth transistor T8 is connected to the nth gate3 signal Sc3(*n*), a source electrode of the eighth transistor T8 is connected to a source electrode of the first transistor T1, a source electrode of the second transistor T2 and a drain electrode of the fifth transistor T5, and a drain electrode of the eighth transistor T8 is connected to a stress voltage Vobs.

The storage capacitor Cs stores the data signal Vdata and the threshold voltage Vth. A first capacitor electrode of the storage capacitor Cs is connected to the gate electrode of the first transistor T1 and the drain electrode of the fourth transistor T4, and a second capacitor electrode of the storage capacitor Cs is connected to the high level voltage Vdd and the source electrode of the fifth transistor T5.

The light emitting diode De is connected between the sixth and seventh transistors T6 and T7 and the low level voltage Vss to emit a light of a luminance proportional to a current of the first transistor T1. An anode of the light emitting diode De is connected to the drain electrode of the sixth transistor T6 and the source electrode of the seventh transistor T7, and a cathode of the light emitting diode De is connected to the low level voltage Vss.

The source electrode of the first transistor T1, the source electrode of the second transistor T2, the drain electrode of the fifth transistor T5 and the source electrode of the eighth transistor T8 constitute a first node N1, and the gate electrode of the first transistor T1, the drain electrode of the third transistor T3, the first capacitor electrode of the storage capacitor Cs and the drain electrode of the fourth transistor T4 constitute a second node N2. The source electrode of the first transistor T1, the drain electrode of the third transistor T3 and the source electrode of the sixth transistor T6 constitute a third node N3, and the drain electrode of the sixth transistor T6, the source electrode of the seventh transistor T7 and the anode of the light emitting diode De constitute a fourth node N4.

In the display device 110, a luminance of a light emitted from the light emitting diode De is adjusted using a pulse width modulation and a variable low level voltage.

Figure 3:
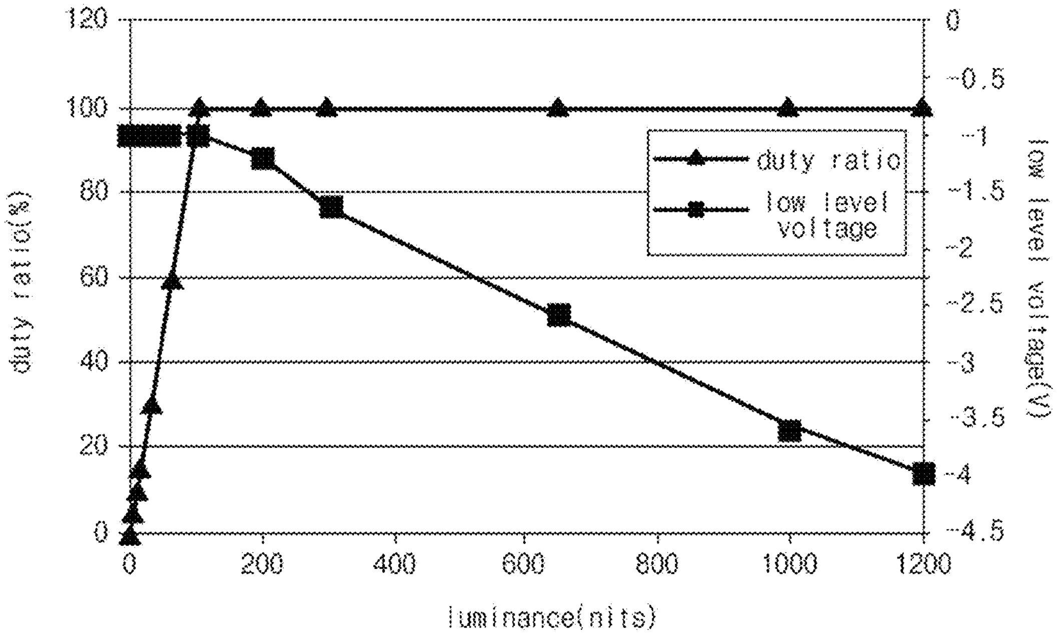
FIG. 3 is a view showing a luminance with respect to a duty ratio and a low level voltage of a display device according to an embodiment of the present disclosure.

FIG. 3 is a view showing a luminance with respect to a duty ratio and a low level voltage of a display device according to an embodiment of the present disclosure.

In FIG. 3, the light emitting diode De of the display device 110 according to an embodiment of the present disclosure emits a light having a luminance smaller than about 100 nits due to a pulse width modulation (PWM) under the same voltage and emits a light of a luminance equal to or greater than about 100 nits due to a variable low level voltage Vss.

For example, the luminance of the light emitted from the light emitting diode De can increase within a range smaller than about 100 nits by increasing the duty ratio within a range of about 0% to about 100%, and the luminance of the light emitted from the light emitting diode De can increase within a range equal to or greater than about 100 nits by decreasing the low level voltage Vss within a range of about −0.75V to about −4V.

The duty ratio can be defined as a percentage of an emission period with respect to an entire high level period of a square wave.

In the display device 110 according to an embodiment of the present disclosure, a power consumption can be reduced and a natural luminance change can be obtained by adjusting a luminance in a relatively low luminance range due to a pulse width modulation and adjusting a luminance in a relatively high luminance range due to a variable low level voltage.

In the display device 110, one frame can be classified into a refresh subframe and an anode reset subframe.

Figure 4:
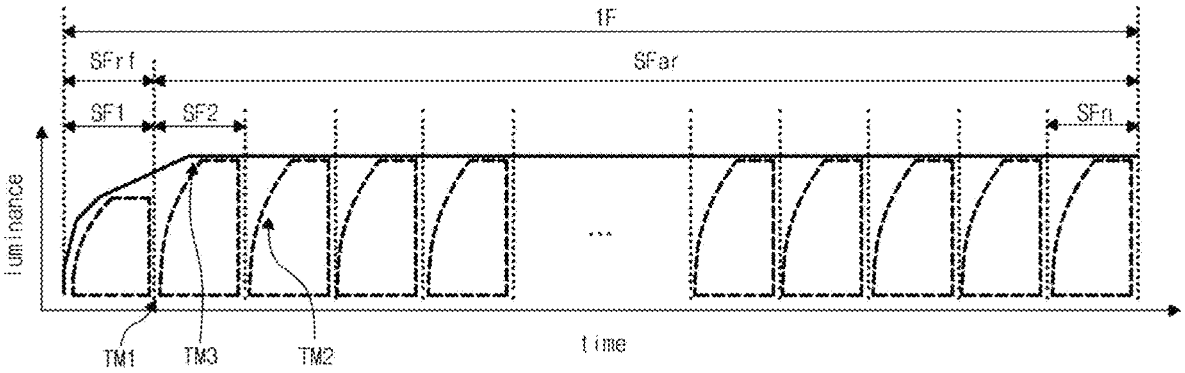
FIG. 4 is a view showing a luminance change in one frame of a display device according to an embodiment of the present disclosure.
Figure 5:
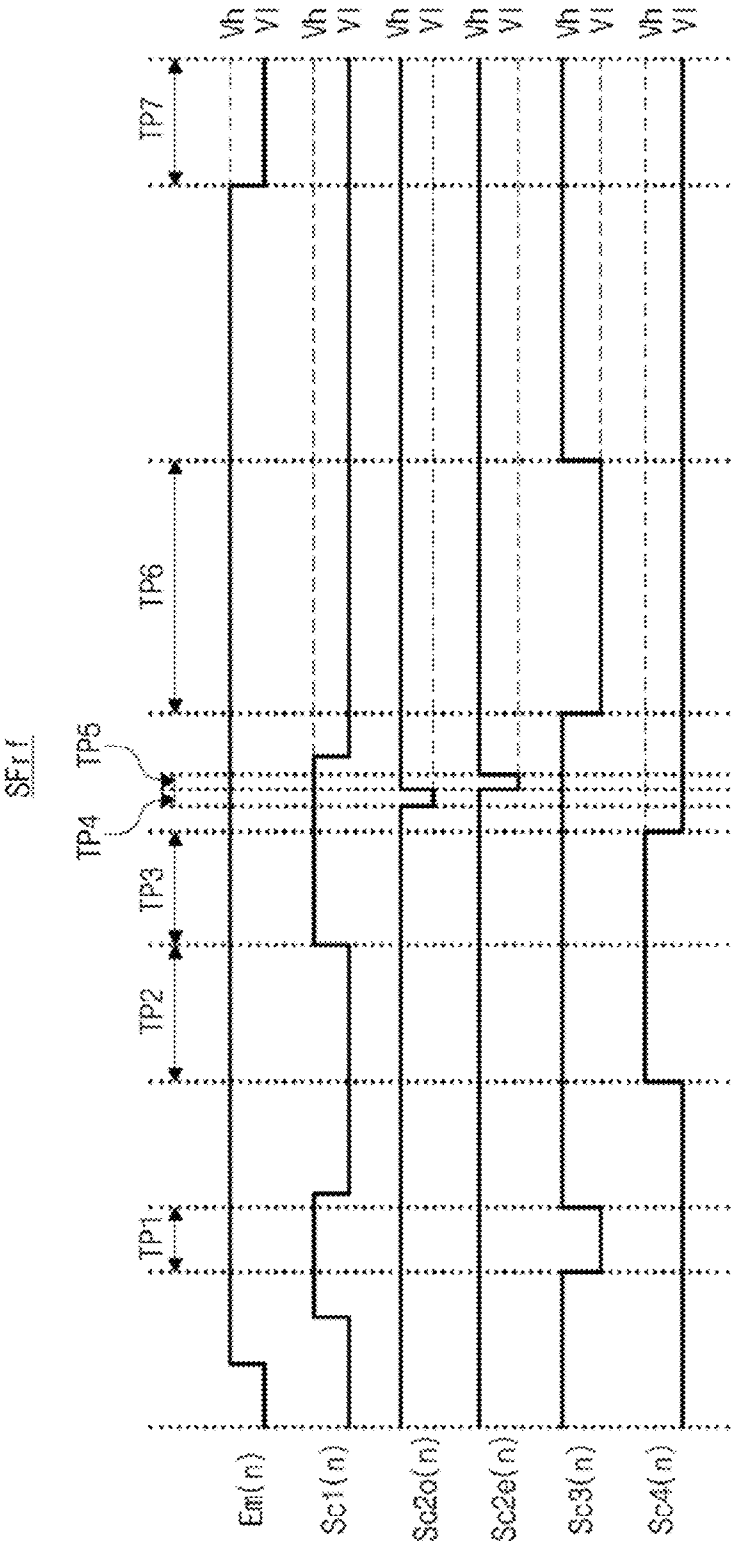
FIG. 5 is a view showing a plurality of signals in a refresh subframe of a display device according to an embodiment of the present disclosure.
Figure 6:
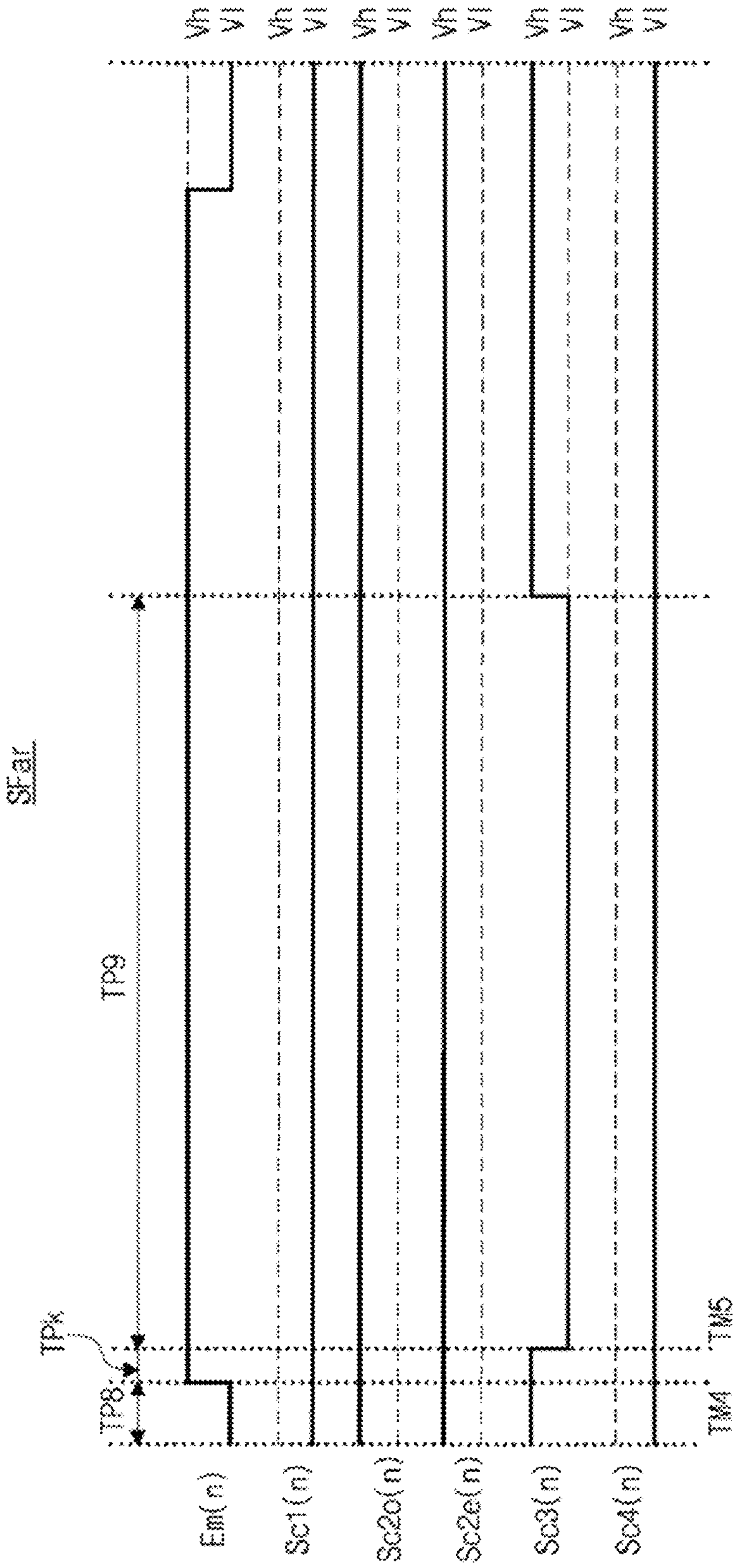
FIG. 6 is a view showing a plurality of signals in an anode reset subframe of a display device according to an embodiment of the present disclosure.

FIG. 4 is a view showing a luminance change in one frame of a display device according to an embodiment of the present disclosure, FIG. 5 is a view showing a plurality of signals in a refresh subframe of a display device according to an embodiment of the present disclosure, and FIG. 6 is a view showing a plurality of signals in an anode reset subframe of a display device according to an embodiment of the present disclosure.

In FIG. 4, one frame 1F of a display device 110 according to an embodiment of the present disclosure includes first to nth subframes SF1 to SFn. The first subframe SF1 constitutes a refresh subframe SFrf where the data signal Vdata is inputted and the first to fourth nodes N1 to N4 are reset, and the second to nth subframes SF2 to SFn constitute an anode reset subframe SFar where the data signal Vdata of a previous subframe is maintained without an input of a new data signal Vdata and the first, third and fourth nodes N1, N3 and N4 are reset.

Since an image display is stopped (off) at a first timing TM1 of a starting timing of each of the first to nth subframes SF1 to SFn, the first, third and fourth nodes N1, N3 and N4 are not reset in the second to nth subframes SF2 and SFn. As a result, a flicker component is dispersed and a luminance change is reduced as compared with a comparison example where an image display is stopped only at a starting timing of the first subframe SF1.

For example, when the display device 110 is driven with a frequency of about 10 Hz, a relatively great flicker component occurs at a frequency of about 10 Hz in a comparison example where an image display is stopped only at a starting timing of the first subframe SF1. In an embodiment of the present disclosure where an image display is stopped at the first timing TM1 of a starting timing of each of the first to nth subframes SF1 to SFn, a relatively small flicker component occurs widely at a frequency of about 10 Hz to about 120 Hz and an entire luminance change is reduced.

Since the first, third and fourth nodes N1, N3 and N4 are reset at a second timing TM2 of an intermediate timing of each of the first to nth subframes SF1 to SFn, a luminance change is reduced and a luminance is relatively rapidly saturated at a third timing TM3 of an intermediate timing of the second subframe SF2.

Similarly to the first subframe SF1, since the first, third and fourth nodes N1, N3 and N4 are reset at a second timing TM2 of an intermediate timing of the second subframe SF2, a luminance deviation between the refresh subframe SFrf and the anode rest subframe SFar is reduced.

In FIG. 5, during a first period TP1 of the refresh subframe SFrf of the display device 110 according to an embodiment of the present disclosure, the nth emission signal Em(n), the nth gate1 signal Sc1(*n*), the nth odd gate2 signal Sc2*o*(*n*) and the nth even gate2 signal Sc2*e*(*n*) have a logic high voltage Vh, and the nth gate3 signal Sc3(*n*) and the nth gate4 signal Sc4(*n*) have a logic low voltage Vl.

The first, third, seventh and eighth transistors T1, T3, T7 and T8 are turned on, and the second, fourth, fifth and sixth transistors T2, T4, T5 and T6 are turned off. As a result, the stress voltage Vobs is applied to the first, third and second nodes N1, N3 and N2 through the eighth, first and third transistors T8, T1 and T3, and the anode reset voltage Var is applied to the fourth node N4 through the seventh transistor T7.

Accordingly, during the first period TP1, the first to fourth nodes N1 to N4 are reset and a hysteresis due to the previous frame is reduced or prevented.

During a second period TP2, the nth emission signal Em(n), the nth odd gate2 signal Sc2*o*(*n*), the nth even gate2 signal Sc2*e*(*n*), the nth gate3 signal Sc3(*n*) and the nth gate4 signal Sc4(*n*) have a logic high voltage Vh, and the nth gate1 signal Sc1(*n*) have a logic low voltage Vl.

The fourth transistor T4 is turned on, and the first, second, third, fifth, sixth, seventh and eighth transistors T1, T2, T3, T5, T6, T7 and T8 are turned off. As a result, the initial voltage Vini is applied to the second node N2 through the fourth transistor T4.

Accordingly, during the second period TP2, the second node N2 is reset to be initialized.

During a third period TP3, the nth emission signal Em(n), the nth gate1 signal Sc1(*n*), the nth odd gate2 signal Sc2*o*(*n*), the nth even gate2 signal Sc2*e*(*n*), the nth gate3 signal Sc3(*n*) and the nth gate4 signal Sc4(*n*) have a logic high voltage Vh.

The first, third and fourth transistor T1, T3 and T4 are turned on, and the second, fifth, sixth, seventh and eighth transistors T2, T5, T6, T7 and T8 are turned off. As a result, the initial voltage Vini is applied to the second, third and first nodes N2, N3 and N1 through the fourth, third and first transistors T4, T3 and T1.

Accordingly, during the third period TP3, the second, third and first nodes N2, N3 and N1 are reset to be initialized.

During a fourth period TP4, the nth emission signal Em(n), the nth gate1 signal Sc1(*n*), the nth even gate2 signal Sc2*e*(*n*) and the nth gate3 signal Sc3(*n*) have a logic high voltage Vh, and the nth odd gate2 signal Sc2*o*(*n*) and the nth gate4 signal Sc4(*n*) have a logic low voltage Vl.

The first, second and third transistors T1, T2 and T3 are turned on, and the fourth, fifth, sixth, seventh and eighth transistors T4, T5, T6, T7 and T8 are turned off. As a result, the data voltage Vdata is applied to the second node N2 through the second, first and third transistors T2, T1 and T3.

Accordingly, during the fourth period TP4, the data signal Vdata is applied to the second node N2 and a sum (Vdata+Vth) of the data signal Vdata and a threshold voltage Vth of the first transistor T1 is applied to the gate electrode of the first transistor T1 to be stored in the storage capacitor Cs.

During a fifth period TP5, the nth emission signal Em(n), the nth gate1 signal Sc1(*n*), the nth odd gate2 signal Sc2*o*(*n*) and the nth gate3 signal Sc3(*n*) have a logic high voltage Vh, and the nth even gate2 signal Sc2*e*(*n*) and the nth gate4 signal Sc4(*n*) have a logic low voltage Vl.

The first, second and third transistors T1, T2 and T3 are turned on, and the fourth, fifth, sixth, seventh and eighth transistors T4, T5, T6, T7 and T8 are turned off. As a result, the data voltage Vdata is applied to the second node N2 through the second, first and third transistors T2, T1 and T3.

Accordingly, during the fifth period TP5, the data signal Vdata is applied to the second node N2 and a sum (Vdata+Vth) of the data signal Vdata and a threshold voltage Vth of the first transistor T1 is applied to the gate electrode of the first transistor T1 to be stored in the storage capacitor Cs.

During a sixth period TP6, the nth emission signal Em(n), the nth odd gate2 signal Sc2*o*(*n*) and the nth even gate2 signal Sc2*e*(*n*) have a logic high voltage Vh, and the nth gate1 signal Sc1(*n*), the nth gate3 signal Sc3(*n*) and the nth gate4 signal Sc4(*n*) have a logic low voltage Vl.

The first, seventh and eighth transistors T1, T7 and T8 are turned on, and the second, third, fourth, fifth and sixth transistors T2, T3, T4, T5 and T6 are turned off. As a result, the stress voltage Vobs is applied to the first and third nodes N1 and N3 through the eighth and first transistors T8 and T1, and the anode reset voltage Var is applied to the fourth node N4 through the seventh transistor T7.

Accordingly, during the sixth period TP6, the first, third and fourth nodes N1, N3 and N4 are reset and a hysteresis due to a previous timing is reduced or prevented.

During a seventh period TP7, the nth odd gate2 signal Sc2*o*(*n*), the nth even gate2 signal Sc2*e*(*n*) and the nth gate3 signal Sc3(*n*) have a logic high voltage Vh, and the nth emission signal Em(n), the nth gate1 signal Sc1(*n*) and the nth gate4 signal Sc4(*n*) have a logic low voltage Vl.

The first, fifth and sixth transistors T1, T5 and T6 are turned on, and the second, third, fourth, seventh and eighth transistors T2, T3, T4, T7 and T8 are turned off. As a result, the high level voltage Vdd is applied to the fourth node N4 through the fifth, first and sixth transistors T5, T1 and T6. In addition, the threshold voltage Vth of the first transistor is compensated, and a current corresponding to the data signal Vdata flows through the first transistor T1 turned on.

Accordingly, during the seventh period TP7, the light emitting diode De emits a light having a luminance corresponding to the data signal Vdata of the present frame.

In FIG. 6, during an eighth period TP8 of the anode reset subframe SFar of the display device 110 according to an embodiment of the present disclosure, the nth odd gate2 signal Sc2*o*(*n*), the nth even gate2 signal Sc2*e*(*n*) and the nth gate3 signal Sc3(*n*) have a logic high voltage Vh, and the nth emission signal Em(n), the nth gate1 signal Sc1(*n*) and the nth gate4 signal Sc4(*n*) have a logic low voltage Vl.

The first, fifth and sixth transistors T1, T5 and T6 are turned on, and the second, third, fourth, seventh and eighth transistors T2, T3, T4, T7 and T8 are turned off. As a result, the high level voltage Vdd is applied to the fourth node N4 through the fifth, first and sixth transistors T5, T1 and T6. In addition, the threshold voltage Vth of the first transistor is compensated, and a current corresponding to the data signal Vdata flows through the first transistor T1 turned on.

Accordingly, during the eighth period TP8, the light emitting diode De emits a light having a luminance corresponding to the data signal Vdata of the refresh subframe.

During a ninth period TP9, the nth emission signal Em(n), the nth odd gate2 signal Sc2*o*(*n*) and the nth even gate2 signal Sc2*e*(*n*) have a logic high voltage Vh, and the nth gate1 signal Sc1(*n*), the nth gate3 signal Sc3(*n*) and the nth gate4 signal Sc4(*n*) have a logic low voltage Vl.

The first, seventh and eighth transistors T1, T7 and T8 are turned on, and the second, third, fourth, fifth and sixth transistors T2, T3, T4, T5 and T6 are turned off. As a result, the stress voltage Vobs is applied to the first and third nodes N1 and N3 through the eighth and first transistors T8 and T1, and the anode reset voltage Var is applied to the fourth node N4 through the seventh transistor T7.

Accordingly, during the ninth period TP9, the first, third and fourth nodes N1, N3 and N4 are reset and a hysteresis due to the previous timing is reduced or prevented.

In the display device 110, the light emitting diode De emits a light having a relatively low luminance range due to the duty ratio of the pulse width modulation. Since a width of the low level voltage Vl of the emission period of the nth emission signal Em(n) is changed according to the duty ratio, a fourth timing TM4 of a rising timing of the nth emission signal Em(n) is changed.

In a display device of a comparison example where a fifth timing TM5 of a falling timing of the nth gate3 signal Sc3(*n*) is fixed, a width of a kickback period TPk between the fourth and fifth timings TM4 and TM5 is changed (increases or decreases).

For example, when the duty ratio increases, the fourth timing TM4 moves toward a positive (+) direction (right direction) of a horizontal axis (time axis) of a timing chart and a width of the kickback period TPk decreases. When the duty ratio decreases, the fourth timing TM4 moves toward a negative (−) direction (left direction) of a horizontal axis (time axis) of a timing chart and a width of the kickback period TPk increases.

Since a coupling between a transmission line of the nth emission signal Em(n) and a transmission line of the nth gate3 signal Sc3(*n*) occurs in the kickback period TPk, a ripple (kickback voltage) occurs in a voltage of the fourth node N4 at the fourth timing TM4 of a rising timing of the nth emission signal Em(n). When the duty ratio decreases, the fourth timing TM4 moves toward a negative (−) direction (left direction) of a horizontal axis of a timing chart and a width of the kickback period TPk increases. In addition, a voltage of the fourth node N4 is reduced and a peak luminance of the light emitting diode De is reduced.

In a display device of a comparison example where the fifth timing TM5 of a falling timing of the nth gate3 signal Sc3(*n*) is fixed, when the duty ratio decreases, an influence of reduction of the peak luminance increases and an abnormal phenomenon such as a luminance inversion can occur. In addition, an abnormal phenomenon such as a gamma breakdown and a black rising can occur due to the luminance inversion.

In the display device 110 according to an embodiment of the present disclosure, since the fourth timing TM4 of a falling timing of the nth gate3 signal Sc3(*n*) is changed according to the duty ratio, a width of the kickback period TPk between the fourth timing TM4 of a rising timing of the nth emission signal Em(n) and the fifth timing TM5 of a falling timing of the nth gate3 signal Sc3(*n*) can be kept constant regardless of the duty ratio.

For example, when the duty ratio increases and the fourth timing TM4 moves toward a positive (+) direction of a horizontal axis of a timing chart (toward the fifth timing TM5 of FIG. 6), the fifth timing TM5 also moves toward a positive (+) direction of a horizontal axis of a timing chart. When the duty ratio decreases and the fourth timing TM4 moves toward a negative (−) direction of a horizontal axis of a timing chart (toward an opposite direction of the positive (+) direction), the fifth timing TM5 also moves toward a negative (−) direction of a horizontal axis of a timing chart. As a result, a width of the kickback period TPk can be kept constant.

Since a width of the kickback period TPk between the fourth and fifth timings TM4 and TM5 is fixed regardless of a duty ratio, a voltage deviation of the fourth node N4 and a peak luminance deviation of the light emitting diode De according to the duty ratio are reduced or minimized. As a result, an occurrence of an abnormal phenomenon such as a luminance inversion, a gamma breakdown and a black rising is minimized, reduced or prevented.

Since the first, third and fourth nodes N1, N3 and N4 are reset during the ninth period TP9 next to the fifth timing TM5 of a falling timing of the nth gate3 signal Sc3(*n*), a ripple (kickback voltage) due to a coupling is removed.

Movement of the fifth timing according to the duty ratio will be illustrated with reference to FIG. 7.

Figure 7:
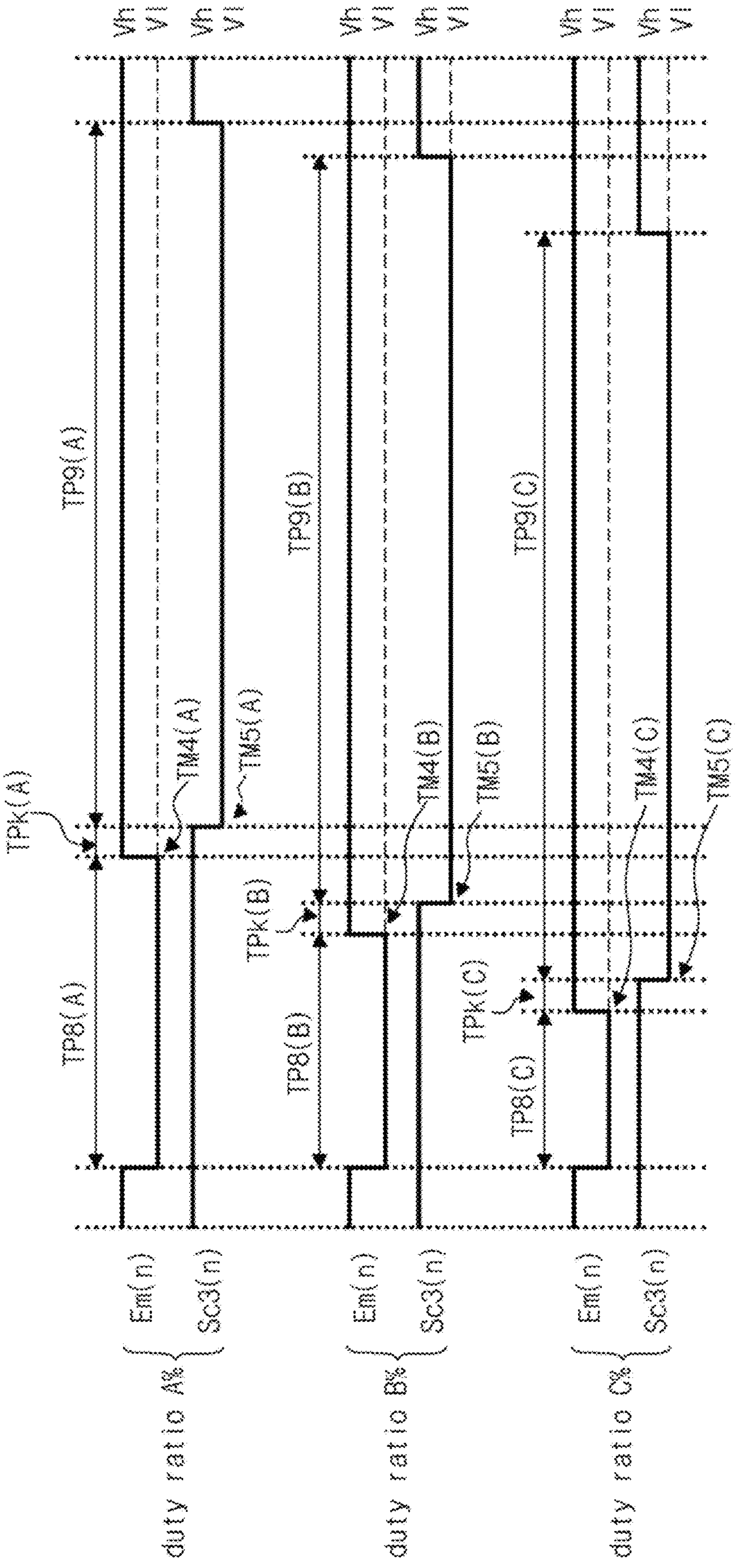
FIG. 7 is a view showing a movement of a fifth timing with respect to a duty ratio of a display device according to an embodiment of the present disclosure.

FIG. 7 is a view showing a movement of a fifth timing with respect to a duty ratio of a display device according to an embodiment of the present disclosure.

In FIG. 7, the display device 110 according to an embodiment of the present disclosure adjusts a luminance of a light within a relatively low luminance range emitted from the light emitting diode De by moving the fourth timing TM4 of a rising timing of the nth emission signal Em(n) and changing a width of the eighth period TP8 according to the duty ratio.

For example, the nth emission signal Em(n) can have a low logic voltage Vl during the eighth A period TP8(A) for a duty ratio of A %. For a duty ratio of B % smaller than A %, a fourth A timing TM4(A) can move to a fourth B timing TM4(B) of a negative (−) direction and the nth emission signal Em(n) can have a low logic voltage Vl during the eighth B period TP8(B) having a width smaller than a width of the eighth A period TP8(A). For a duty ratio of C % smaller than B %, the fourth B timing TM4(B) can move to a fourth C timing TM4(C) of a negative (−) direction and the nth emission signal Em(n) can have a low logic voltage Vl during the eighth C period TP8(C) having a width smaller than the width of the eighth B period TP8(B). As a result, as the duty ratio is changed from A % to C %, a luminance of a light emitted from the light emitting diode De can be reduced.

The fifth timing TM5 of a falling timing of the nth gate3 signal Sc3(*n*) is not fixed and moves according to the duty ratio. As a result, the width of the kickback period TPk between the fourth and fifth timings TM4 and TM5 can be kept constant.

For example, the nth gate3 signal Sc3(*n*) can have a falling timing at the fifth A timing TM5(A) according to the duty ratio of A %. For the duty ratio of B % smaller than A %, the fifth A timing TM5(A) can move toward the negative (−) direction and the nth gate3 signal Sc3(*n*) can have a falling timing at the fifth B timing TM5(B). For the duty ratio of C % smaller than B %, the fifth B timing TM5(B) can move toward the negative (−) direction and the nth gate3 signal Sc3(*n*) can have a falling timing at the fifth C timing TM5(C). As a result, the kickback periods TPk(A), TPk(B) and TPk(C) between the fourth and fifth timings TM4 and TM5 for the duty ratios of A %, B % and C % can have substantially the same widths. (TPk(A)=TPk(B)=TPk(C))

As an example, A %, B % and C % can be about 80%, about 60% and about 40%, respectively. The width of the kickback period TPk(A), TPk(B) and TPk(C) can be about 10 horizontal periods (10H), and the width of the ninth period TP9(A), TP9(B) and TP9(C) can be about 28 horizontal periods (28H).

Although the rising timing of the nth gate3 signal Sc3(*n*) moves according to the duty ratio and the ninth A period TP9(A), the ninth B period TP9(B) and the ninth C period TP9(C) have the same width as each other in FIG. 7, the rising timing of the nth gate3 signal Sc3(*n*) can be fixed regardless of the duty ratio and the ninth A period TP9(A), the ninth B period TP9(B) and the ninth C period TP9(C) can have different widths in another embodiment.

In the display device 110 according to an embodiment of the present disclosure, since the fifth timing TM5 of a falling timing of the nth gate3 signal Sc3($n$) changes according to the duty ratio, the width of the kickback period TPk between the fourth timing TM4 of a rising timing of the nth emission signal Em(n) and the fifth timing TM5 of a falling timing of the nth gate3 signal Sc3($n$) can be kept constant regardless of the duty ratio. As a result, the voltage deviation of the fourth node N4 and the peak luminance deviation of the light emitting diode De according to the duty ratio can be reduced or minimized, and an abnormal phenomenon such as a luminance inversion, a gamma breakdown and a black rising can be reduced or prevented.

It will be apparent to those skilled in the art that various modifications and variation can be made in the present disclosure without departing from the scope of the disclosure. Thus, it is intended that the present disclosure cover the modifications and variations of this disclosure provided they come within the scope of the appended claims.

What is claimed is:

1. A display device, comprising:

a timing controlling unit configured to generate an image data, a data control signal and a gate control signal;

a data driving unit configured to generate a data signal using the image data and the data control signal;

a gate driving unit configured to generate a gate1 signal, an odd gate2 signal, an even gate2 signal, a gate3 signal, a gate4 signal and an emission signal using the gate control signal; and a display panel configured to display an image using the gate1 signal, the odd gate2 signal, the even gate2 signal, the gate3 signal, the gate4 signal and the emission signal, wherein a rising timing of the emission signal and a falling timing of the gate3 signal are changed according to a duty ratio, wherein a rising timing of the gate3 signal is fixed regardless of the duty ratio, and wherein a width between the falling timing of the gate3 signal and the rising timing of the gate3 signal is changed according to the duty ratio.

2. The display device of claim 1, wherein a width of a kickback period between the rising timing of the emission signal and the falling timing of the gate3 signal is fixed regardless of the duty ratio.

3. The display device of claim 1, wherein a width of an emission period between a falling timing of the emission signal and the rising timing of the emission signal is changed according to the duty ratio.

4. The display device of claim 1, wherein a luminance of a light emitted from a light emitting diode is adjusted according to the duty ratio within a first luminance range, and is adjusted according to a low level voltage applied to the light emitting diode within a second luminance range.

5. The display device of claim 4, wherein the luminance of the light emitted from the light emitting diode increases within the first luminance range less than 100 nits by increasing the duty ratio within a range of 0% to 100%, and increases within the second luminance range equal to or greater than 100 nits by decreasing the low level voltage within −0.75V to −4V.

6. The display device of claim 1, wherein the display panel includes a plurality of subpixels, and wherein each of the plurality of subpixels comprises:

a storage capacitor connected to a high level voltage;

a first transistor switched according to a voltage of a first capacitor electrode of the storage capacitor;

a second transistor switched according to one of the odd gate2 signal and the even gate2 signal and connected to the data signal and the first transistor;

a third transistor switched according to the gate1 signal and connected to the storage capacitor and the first transistor; and a fourth transistor switched according to the gate4 signal and connected to the storage capacitor and an initial voltage.

7. The display device of claim 6, wherein each of the plurality of subpixels further comprises:

a fifth transistor switched according to the emission signal and connected to the high level voltage and the first transistor;

a sixth transistor switched according to the emission signal and connected to the first transistor;

a seventh transistor switched according to the gate3 signal and connected to an anode reset voltage and the sixth transistor;

an eighth transistor switched according to the gate3 signal and connected to a stress voltage and the first transistor; and a light emitting diode connected between the sixth transistor and a low level voltage.

8. The display device of claim 7, wherein each of at least one of the first to eighth transistors is an oxide semiconductor thin film transistor.

9. The display device of claim 7, wherein the display panel displays the image during a plurality of frames, and wherein each of the plurality of frames includes:

a refresh subframe where the data signal is inputted and a first node between the first, second, fifth and eighth transistors, a second node between the first, third and fourth transistors and the storage capacitor, a third node between the first, third and sixth transistors, and a fourth node between the sixth and seventh transistors and the light emitting diode are reset; and an anode reset subframe where the first, third and fourth nodes are reset without an input of the data signal.

10. The display device of claim 9, wherein the refresh subframe includes first to seventh periods, wherein during the first period, the first, third, seventh and eighth transistors are turned on, the second, fourth, fifth and sixth transistors are turned off, the stress voltage is applied to the first, third and second nodes, and the anode reset voltage is applied to the fourth node, wherein during the second period, the fourth transistor is turned on, the first, second, third, fifth, sixth, seventh and eighth transistors are turned off, and the initial voltage is applied to the second node, and wherein during the third period, the first, third and fourth transistors are turned on, the second, fifth, sixth, seventh and eighth transistors are turned off, and the initial voltage is applied to the second, third and first nodes.

11. The display device of claim 10, wherein during the fourth period, the first, second and third transistors are turned on, the fourth, fifth, sixth, seventh and eighth transistors are turned off, and the data signal is applied to the second node, wherein during the fifth period, the first, second and third transistors are turned on, the fourth, fifth, sixth, seventh and eighth transistors are turned off, and the data signal is applied to the second node, wherein during the sixth period, the first, seventh and eighth transistors are turned on, the second, third, fourth, fifth and sixth transistors are turned off, the stress voltage is applied to the first and third nodes, and the anode reset voltage is applied to the fourth node, and wherein during the seventh period, the first, fifth and sixth transistors are turned on, the second, third, fourth, seventh and eighth transistors are turned off, and the high level voltage is applied to the fourth node.

12. The display device of claim 9, wherein the anode reset subframe includes eighth and ninth periods, wherein during the eighth period, the first, fifth and sixth transistors are turned on, the second, third, fourth, seventh and eighth transistors are turned off, and the high level voltage is applied to the fourth node, and wherein during the ninth period, the first, seventh and eighth transistors are turned on, the second, third, fourth, fifth and sixth transistors are turned off, the stress voltage is applied to the first and third nodes, and the anode reset voltage is applied to the fourth node.

* * * * *